UNITED STATES PATENT OFFICE.

DAVID JOHN GILES AND JAMES EARL GILES, OF McKEESPORT, PENNSYLVANIA.

PROCESS OF EXTRACTING TUNGSTEN AND SIMILAR METALS FROM THEIR ORES.

1,293,404.

Specification of Letters Patent.

Patented Feb. 4, 1919.

No Drawing. Application filed March 15, 1918. Serial No. 222,705.

*To all whom it may concern:*

Be it known that we, DAVID JOHN GILES and JAMES EARL GILES, residents of McKeesport, in the county of Allegheny and State of Pennsylvania, have invented a new and useful Improvement in Processes of Extracting Tungsten and Similar Metals from Their Ores, of which the following is a specification.

This invention relates to a process of extracting from their ores such metals as tungsten, vanadium, uranium and molybdenum. The object of the invention is to provide a process for extracting the above named metals from their ores whereby the metals can be produced in a substantially pure form and at a much lesser cost than by processes heretofore in use.

In general, the process consists in forcing a re-action between the ore and a water solution of some alkali metal compound of alkaline reaction, preferably an alkaline hydrate, whose hydroxid radical is replaceable by the metal of the ore, thus forming an alkaline-metal solution, thereafter treating said solution with a calcium compound to precipitate the impurities as insoluble compounds, and then treating the solution with an acid to precipitate the metal in the form of an insoluble hydrate of tungstic or like acid.

As the alkali metal compound, it is preferred to use sodium hydrate (NaOH) on account of the energy of its reaction, but other alkali metal compounds of alkaline re-action can be used, such as soda ash, *i. e.*, sodium carbonate, ammonium hydrate, or the like; or various potassium compounds of alkaline reactions can be used. As the calcium compound for treating the solution, to precipitate the impurities, use is made of lime in some form, preferably milk of lime, but, if desired, calcium chlorid or any compound of the other alkaline earth-metals may be used instead.

The process will be explained for the extraction of tungsten from its ore with the use of sodium hydrate as the alkali metal compound and milk of lime for the precipitating agent. The re-actions for the treatment of the other ores, or by the use of other re-agents, will be similar to those which will be described.

In carrying out the process the tungsten ore is ground fine and is then placed in a closed vessel in a water solution of sodium hydrate. Heat is applied, thus generating steam in the vessel and producing a pressure and a higher temperature than can be gotten by boiling in an open vessel. We prefer to use a pressure of about 60 pounds per square inch. Under these conditions the re-action takes place vigorously, and only a short treatment is necessary to effect the extraction of the metal. The same result, however, can be obtained by boiling in an open vessel, provided more time is given and the ore is ground very fine.

The ore can be ground fine simultaneously with the treatment thereof by the sodium hydrate, such as in a ball mill, as described in our application, Serial No. 216,559, filed February 11, 1918. It is preferred, however, to grind the tungsten ore to a fine condition before subjecting it to the action of the sodium hydrate. This enables the use of a stationary extractor, and also results in a more uniform extraction, eliminating the necessity of re-treating the coarse particles (which contain a portion of untreated tungsten) that are always present when the ball mill is used.

The treatment of the ore in the sodium hydrate solution in the closed vessel in the manner specified, *i. e.*, under pressure and at a higher heat than can be obtained by boiling in an open vessel, accelerates the re-action whereby the hydroxid radical of the sodium hydrate is replaced by the tungsten, forming a soluble solution of sodium tungstate. The reactions in the closed chamber are according to the following equations:

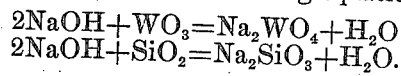

$$2NaOH + WO_3 = Na_2WO_4 + H_2O$$
$$2NaOH + SiO_2 = Na_2SiO_3 + H_2O.$$

This solution is then separated from the gangue, such as by filtering. In the reaction taking place in the extractor some silica and phosphorus go into solution as sodium silicate and sodium phosphate, and these must be removed if the metals are to be produced in a substantially pure form. This is done by cooling the solution coming from the drum to a relatively low temperature, such as room temperature to-wit, in the neighborhood of 60 or 70° Fahrenheit, and diluting it to about eight-tenths ($\tfrac{8}{10}$) of one per cent. (1%) of sodium hydrate, and then adding the calcium compound. The dilution and the cooling to the low temperature can be simultaneously effected by merely adding the necessary amount of cold water to the hot solution coming from the drum.

At this temperature the milk of lime or other calcium compound can be added in excess and precipitates the phosphorus and silica as insoluble calcium compounds, but does not precipitate the tungsten. This reaction is according to the following equations:

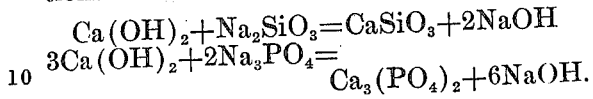

$$Ca(OH)_2 + Na_2SiO_3 = CaSiO_3 + 2NaOH$$
$$3Ca(OH)_2 + 2Na_3PO_4 = Ca_3(PO_4)_2 + 6NaOH.$$

The insoluble phosphorus and silica calcium compounds are separated from the solution by filtering and washing.

The sodium tungstate solution is then further treated by adding thereto a slight excess of an acid, preferably sulfuric or hydrochloric acid on account of their cheapness, although other acids, such as nitric acid may be used. This precipitates the tungsten as a hydrate of tungstic acid according to the equation

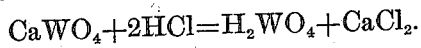

$$CaWO_4 + 2HCl = H_2WO_4 + CaCl_2.$$

The hydrate of tungstic acid is insoluble and is separated from the liquor by filtering after which it is washed, dried, and reduced by means of carbon to metallic tungsten.

If sulfuric acid is used the residual liquor will consist largely of sodium sulfate with a trace of tungsten, and if hydrochloric acid is used the residual liquor consists of sodium chlorid with a trace of tungsten. These salts can be recovered by evaporating and concentrating the liquor to the strength desired, and in this way the last traces of tungsten can also be recovered.

The process described is simple and economical. It can be carried out by the use of simple and easily procured apparatus and requires no jigging or other concentration of the ores before treatment, and is applicable to all kinds of ores of the metals specified, even very low grade ores.

Among the tungsten ores to which it is applicable are ferberite, i. e., iron tungstate, hubnerite, i. e. manganese tungstate, wolframite, which is a mixture of manganese tungstate and iron tungstate, scheelite, i. e., calcium tungstate, as well as to practically all of the ores of vanadium, uranium and molybdenum.

What we claim is:—

1. The process of extracting metals of the character specified from their ores and purifying the same, which consists in treating the ore with a solution of an alkali metal compound of alkaline reaction, then cooling the solution and adding to it a calcium compound, thereby precipitating insoluble calcium compounds of silica and phosphorus, and adding to the residual liquor an acid and thereby precipitating an insoluble acid compound of the metal.

2. The process of extracting metals of the character specified from their ores, which consists in treating the ore in a solution of an alkali metal compound of alkaline reaction while under pressure, separating the solution from the gangue, diluting the solution and adding thereto at a relatively low temperature a calcium compound, thereby precipitating insoluble calcium compounds of silica and phosphorus, and then adding to the residual alkaline-metal solution an acid and thereby forming an insoluble acid compound of the metal as a precipitate.

3. The process of extracting metals of the character specified, which consists in treating the ore in a solution of sodium hydrate, thereby replacing the hydroxid radical of the sodium hydrate by the metal of the ore, separating the solution from the gangue, diluting and cooling the solution and adding thereto a calcium compound, thereby precipitating insoluble calcium compounds of silica and phosphorus, and then adding to the residual alkaline-metal solution an acid and thereby forming an insoluble acid compound of the metal as a precipitate.

4. The process of extracting tungsten from its ores and purifying the same, which consists in treating the ore with a solution of an alkali metal compound of alkaline reaction, thereby forming soluble alkaline tungstate, then diluting and cooling the solution and adding to it a calcium compound and thereby precipitating insoluble calcium compounds of silica and phosphorus, and adding to the residual alkaline tungstate solution an acid and thereby precipitating an insoluble hydrate of tungstic acid.

5. The process of extracting tungsten from its ores and purifying the same, which consists in treating the ore with a solution of an alkali metal compound of alkaline of an alkali metal compound of alkaline reaction while under pressure, thereby forming soluble alkaline tungstate, then diluting and cooling the solution and adding to it at a relatively low temperature a calcium compound and thereby precipitating insoluble calcium compounds of silica and phosphorus, and adding to the residual alkaline tungstate solution sulphuric acid and thereby precipitating the metal as an insoluble hydrate of tungstic acid.

6. The process of extracting tungsten from its ores and purifying the same, which consists in treating the ore with a solution of sodium hydrate, thereby forming soluble sodium tungstate, diluting and cooling said solution and adding thereto a calcium compound, thereby precipitating insoluble calcium compounds of silica and phosphorus, and adding to the residual sodium tungstate solution an acid and thereby precipitating an insoluble hydrate of tungstic acid.

7. The process of extracting tungsten from its ore which consists in treating the tungsten ore in a solution of an alkali metal compound of alkaline reaction while under pressure, thereby forming alkaline tungstate, separating the solution from the gangue, cooling the solution and adding to it at a relatively low temperature a calcium compound and thereby precipitating insoluble calcium compounds of silica and phosphorus, and adding to the residual alkaline tungstate solution an acid and thereby forming insoluble tungstic acid as a precipitate.

8. The process of extracting tungsten from its ore, which consists in treating the ore in a solution of sodium hydrate under pressure, thereby forming sodium tungstate, separating the soluble sodium tungstate solution from the gangue, cooling the solution and adding to it a calcium compound, thereby precipitating insoluble calcium compounds of silica and phosphorus and adding to the residual sodium tungstate solution an acid and thereby forming insoluble hydrate of tungstic acid as a precipitate.

In testimony whereof, we have hereunto set our hands.

DAVID JOHN GILES.
JAMES EARL GILES.

Witness:
CARL F. MORLOCK.